350-96.24
SR
XR 3,202,045
CROSS REFERENCE
SEARCH ROOM

Aug. 24, 1965 W. R. ARSENAULT ETAL 3,202,045

APPARATUS FOR SIMULTANEOUSLY RECORDING SPACED DATA AND CODE ON A SINGLE FRAME OF PHOTOGRAPHIC FILM

Filed Dec. 10, 1962 4 Sheets-Sheet 1

X2530

WILLIAM R. ARSENAULT
JOHN F. CAMERON
JAMES S. THOMPSON
INVENTORS

BY Allen E. Botney

ATTORNEY

3202045
OR IN 355/1

WILLIAM R. ARSENAULT
JOHN F. CAMERON
JAMES S. THOMPSON
INVENTORS
BY Allen E. Botney
ATTORNEY

WILLIAM R. ARSENAULT
JOHN F. CAMERON
JAMES S. THOMPSON
INVENTORS

BY Allen E. Botney
ATTORNEY

WILLIAM R. ARSENAULT
JOHN F. CAMERON
JAMES S. THOMPSON
INVENTORS

BY Allen E. Botney
ATTORNEY

United States Patent Office 3,202,045

Patented Aug. 24, 1965

3,202,045

APPARATUS FOR SIMULTANEOUSLY RECORDING SPACED DATA AND CODE ON A SINGLE FRAME OF PHOTOGRAPHIC FILM

William R. Arsenault, Pacific Palisades, John F. Cameron, Rolling Hills, and James S. Thompson, Playa Del Rey, Calif., assignors to FMA, Inc., El Segundo, Calif., a corporation of California Filed Dec. 10, 1962, Ser. No. 243,509
8 Claims. (Cl. 88—24)

The present invention relates in general to information storage and retrieval systems and more particularly relates to a recording unit for such a system.

A document is simply a source of information. As such, it can take many different forms. It can be hand written, typed, printed, drawn, painted, or photographed. Whatever form the documents happen to take, their usefulness depends on two important, related questions, namely, can the information be stored easily (storage), and can the information be expeditiously obtained when it is needed (retrieval)?

One of the more convenient and economical ways of storing documents to which fast and frequent access is desired is to reduce the documents greatly in size by photographing them. The photographed documents, together with indexing information that describes them, are then stored as reels of films, one document and its associated block of indexing information generally being stored in each film frame of the reel. The indexing information, which describes the document for retrieval purposes, is recorded on an area alongside the area on which the document is recorded, and is customarily in binary-coded form. In retrieving a particular document, the descriptive index associated with that document is punched in binary-coded form on a request card. The descriptive index blocks on the film are then optically scanned in succession, a comparison being made between each descriptive index as it is scanned and the punched data on the card. The requested document is retrieved when a match exists between the blocks of code compared.

The present invention provides a recording unit by means of which a document may be accurately recorded in one defined area on a frame of film and a block of code describing and, therefore, identifying the document may be accurately recorded in a second defined area thereon alongside the first, the essence of the invention, that is, the points of novelty, residing in the fact that the document and its associated block of code may simultaneously be recorded in their respective film areas and, also, in the fact that the initial format and appearance of the abovesaid code block is optically transformed into a different format and appearance at the time of its recordation. More specifically, in the past, when two different blocks of information were to be recorded side by side on a single frame of film, it was necessary to first record one such block of information and immediately thereafter to record the other. Aside from the fact that this requires two steps and is, therefore, more time consuming that if both were recorded in one step, it is also obvious that the possibility of error is thereby increased. If, for example, either the film or the information sources moved during the recordation interval, the high precision of placement of the abovesaid blocks of information with respect to each other is lost.

The present invention overcomes this difficulty by providing a recording apparatus by means of which the two different sources of information can be photographed and, therefore, recorded simultaneously. Furthermore, in the co-pending patent application entitled, "A Code Arrangement," by William R. Arsenault and John F. Cameron, filed December 4, 1962, Serial Number 242,123, a new kind of binary-coded format is described. As explained therein, the binary-coded bits are represented by small square-shaped areas arranged in rows that are one above the other, the bit areas in any one row and in different rows being contiguous to each other, that is, having common sides or borders. Stated differently, the code block is formed so that no space exists between these square-shaped areas. As also explained in that co-pending application, various solid bars or columns are included for frame marker and synchronizing purposes. This new type of code format is obtained from patterns or holes punched through a card, the hole being round in shape and spaced apart. Accordingly, the manner in which the format of holes in the punched card is transformed into a new format of square-shaped areas on the film constitutes a novel feature of the present invention.

It is, therefore, an object of the present invention to provide means for recording two different sources of information on a single frame of film and for doing so simultaneously.

It is another object of the present invention to provide a recording unit by means of which a block of code arranged in one format is optically transformed into a block of code arranged in an entirely different format upon recordation on film.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 4:
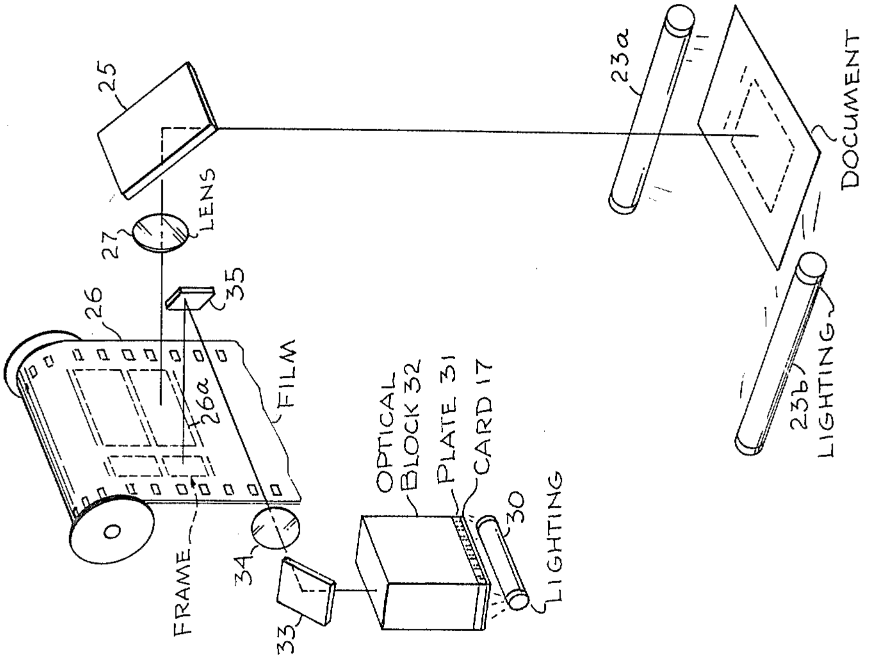
Figure 3:
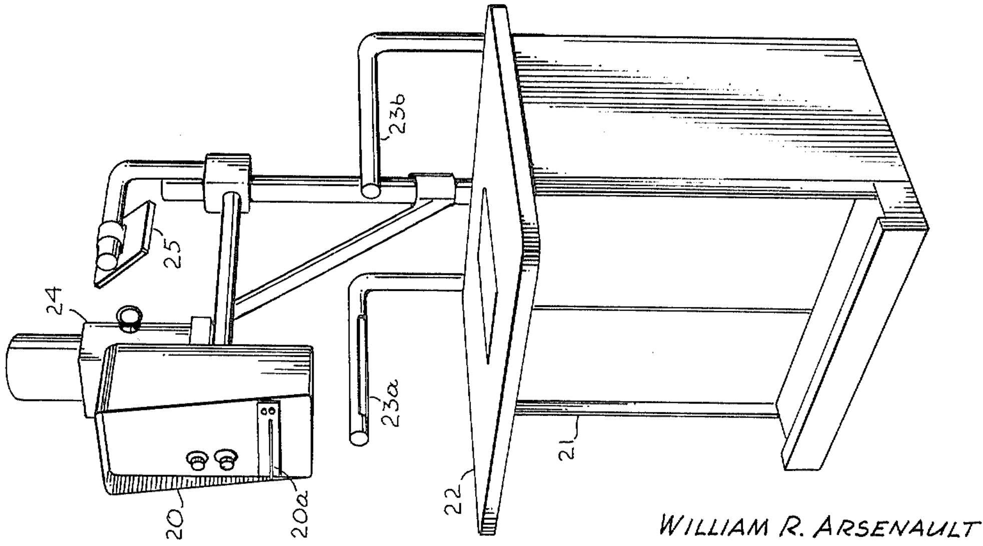
Figure 5A:
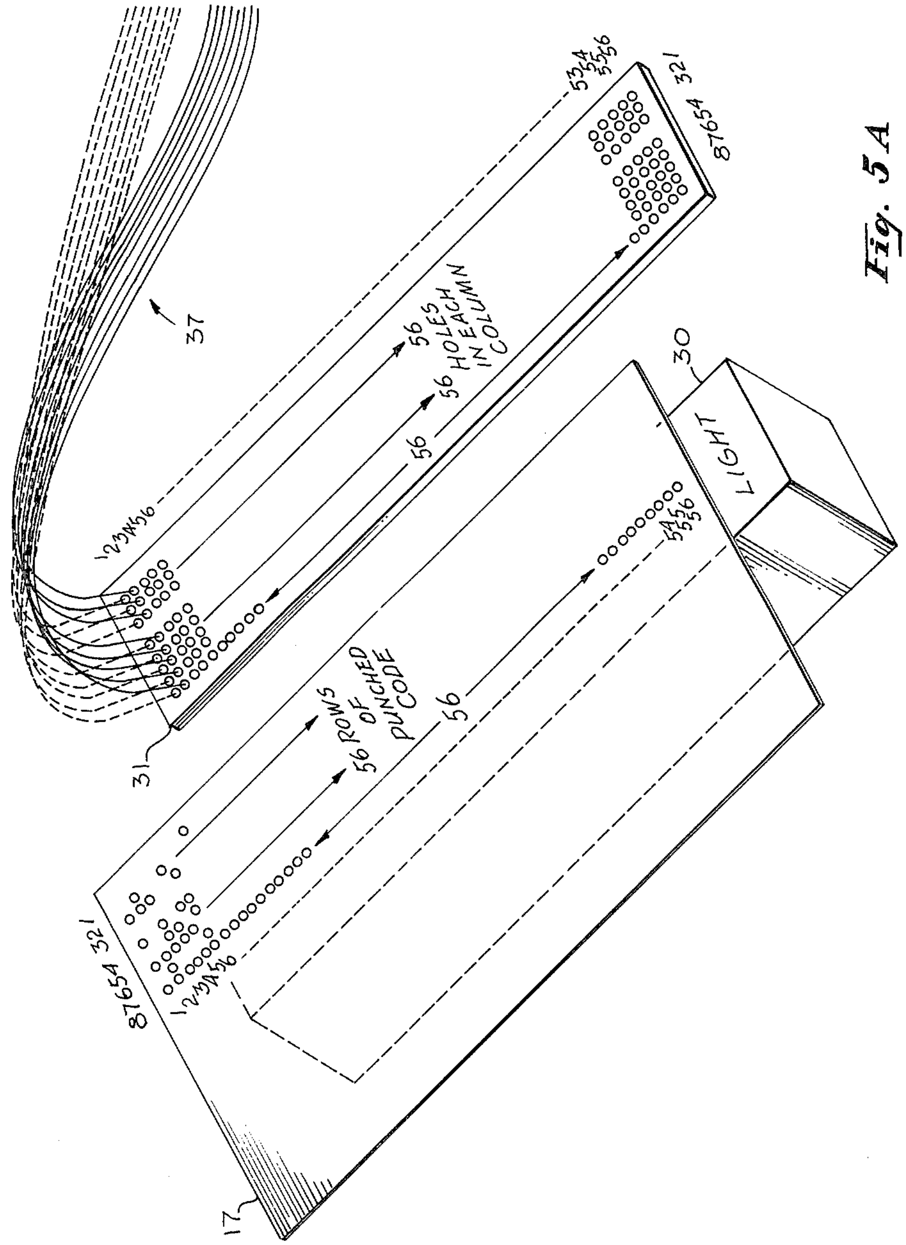
Figure 5B:
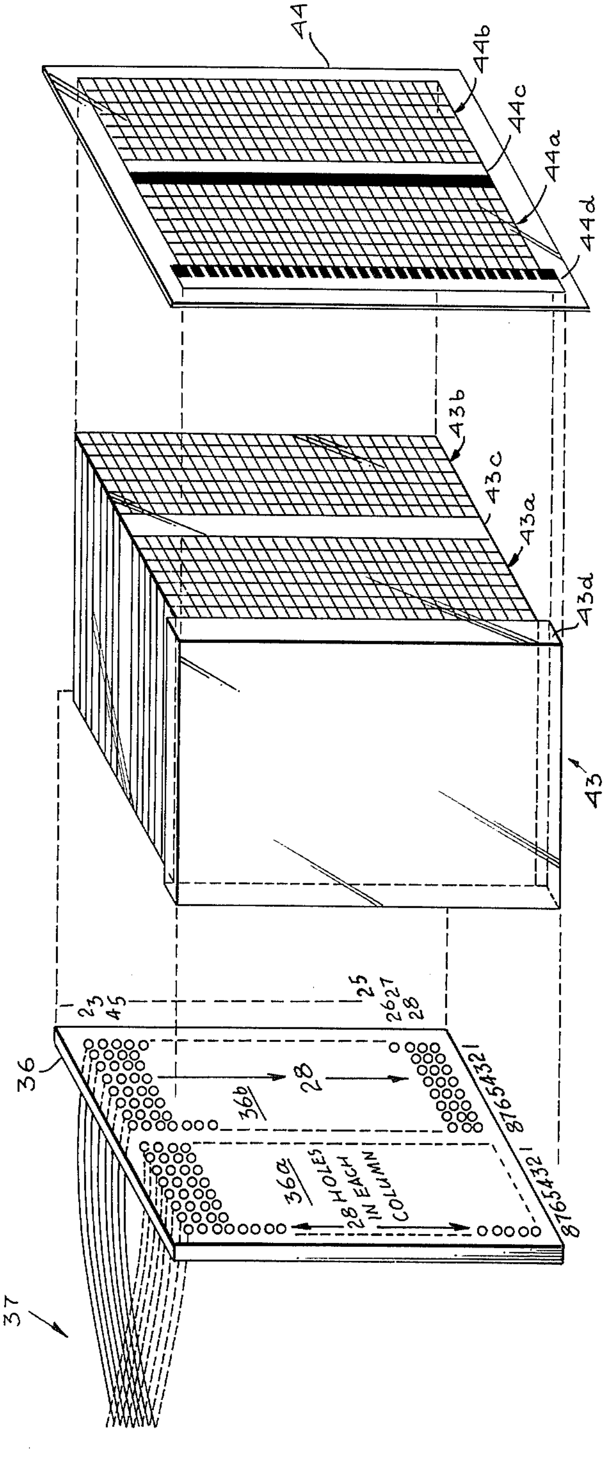
Figure 6:
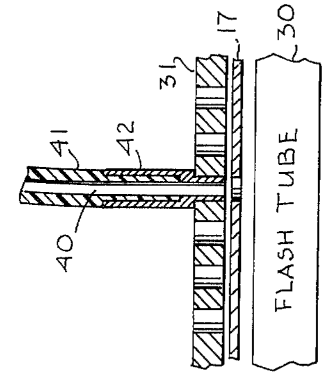

FIGURE 3 generally presents a recording unit in accordance with the present invention;

FIGURE 4 is a functional diagram illustrating the basic structure and principles of operation of a recording unit in accordance with the present invention;

FIGURE 5A illustrates in detail one portion of the apparatus shown in FIG. 4, namely, the card lighting arrangement;

FIGURE 5B illustrates in detail another portion of the apparatus shown in FIG. 4, namely, the optical block; and FIGURE 6 is a cross-sectional view of the manner in which one small portion of the above said optical block is mechanized.

Figure 1:
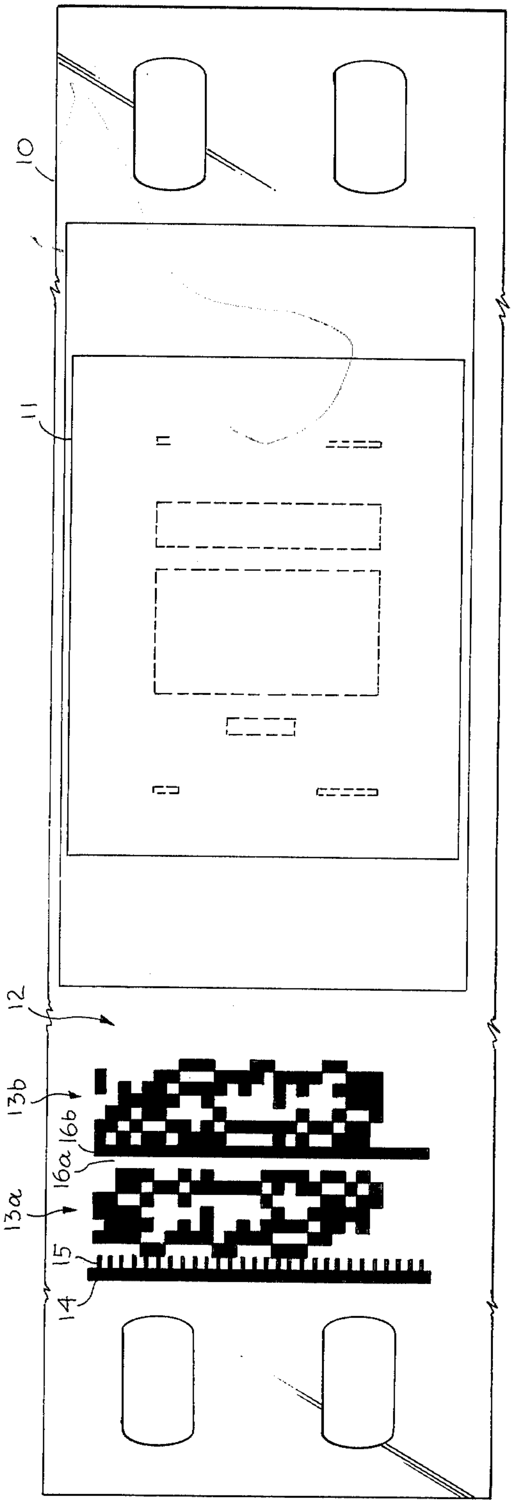
FIGURE 1 illustrates a frame of film on which are recorded a document and a block of code describing that document, both of which are to be simultaneously recorded by the recording unit of the present invention.

Reference is now made to the drawings and in particular to FIGURE 1 wherein a frame of film 10 is shown on which a document 11 is recorded in one area of the film and a block of code describing or identifying the document, generally designated 12, is recorded alongside the document in a second area on the film. The code block is divided into two main sections generally designated 13*a* and 13*b*, each of these sections containing twenty-eight horizontal rows of binary code, one row above the other, each of said rows containing seven binary bits. The binary bit areas are square-shaped and, in order to represent the "0" and "1" digits of the binary code, are either translucent or opaque. As shown, the rows of code as well as the square-shaped binary bit areas in each row are contiguous to each other or, stated differently, abut one another, thereby producing a highly compact code block in which a maximum amount of data is recorded for the area involved.

Moreover, it can be seen from an examination of the code block that the square-shaped areas are lined up to form seven columns of them in each of the abovesaid sections, with the result that each section is a rectangle having 7 x 28 square-shaped areas in it.

To the left of section 13*a*, there is a long vertical bar 14 called a frame marker, as was previously mentioned. As film passes through the retrieval unit in an information storage and retrieval system and is optically scanned, this bar tells the unit that it has encountered a new frame of film and that it now has a page of code to read. Between frame marker 14 and code section 13*a*, there is a series of horizontal short lines called timing marks, such as timing mark 15. These tell the machine that it is at the beginning of a particular line or row of code in the code block and, therefore, that a row of code should be "read out." Consequently, there are as many timing marks 15 as there are rows of code, twenty-eight of them in the code block illustrated in FIG. 1.

Separating code block sections **13*a* and 13*b* are a pair of vertical bars respectively designated 16*a* and 16*b*, one of them being translucent and the other being opaque. In the figure, the lefthand bar, namely, vertical bar 16*a*, is translucent and the righthand bar, namely, vertical bar 16*b*, is opaque, but the reverse could also be true. Bars 16*a* and 16*b*, as well as frame marker 14** are used to periodically synchronize or phase the scan circuitry in the information storage and retrieval system.

Figure 2:
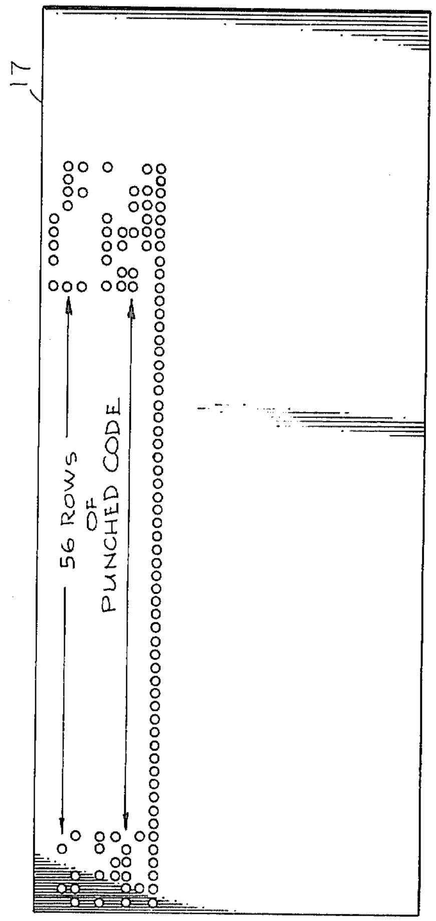
FIGURE 2 illustrates a punched card from which the block of code shown in FIG. 1 is ultimately obtained.

The code block described is obtained from a punched card 17 of the type illustrated in FIG. 2. As shown, the card contains fifty-six rows of holes punched through it, as indicated by numerals 1–56 alongside the card, twenty-eight rows of these holes corresponding to the twenty-eight rows of code in section **13*a* of the code block and the other twenty-eight of them corresponding to the twenty-eight rows of code in section 13*b* of the code block. More specifically, each of the fifty-six rows on the card has up to eight holes punched through it, the rows being arranged one above the other so that eight columns of these holes are formed, as indicated by numerals 1–8 at the head of the card. The first seven columns, that is, columns 1–7, are employed for binary-code purposes and are used to ultimately form the square-shaped translucent and opaque areas in the clode block, a hole punched through the card causing an opaque bit area to be recorded on the film, as will be seen later. The eighth column, on the other hand, is used to form frame marker 14, timing marks 15, and translucent and opaque bars 16*a* and 16*b*. Thus, in the first seven columns mentioned, fifty-six patterns of holes are punched through the card, one pattern in each row, each pattern representing data in binary-coded form. The eighth column is completely punched with holes, that is to say, contains fifty-six holes. It should be noted in connection with what has previously been said that the arrangement of holes on card 17 is the initial format of code block 12** and that the final format of the code block, as shown in FIG. 1, is produced from it by means of novel optical apparatus to be described in detail below.

The recording unit by means of which document 11 and code block 12 in FIG. 1 are simultaneously recorded alongside each other on film frame 10, and by means of which the format of holes punched through card 17 in FIG. 2 is transformed into the format of code block 12, is broadly shown in FIG. 3. Basically, it includes a console 20 that houses light, switches, and optical apparatus for "reading" the punched card and producing from it the final code-block pattern; a cabinet 21 containing the electrical circuitry, such as the power supply, for operating the recording unit; a recording table 22 on which the document to be recorded is positioned and on which there are guide lines for properly positioning the document; a pair of arms **23*a* and 23*b* in which lights are housed for illuminating the document; a camera 24; and a mirror 25 for reflecting the image on the document on table 22 into the camera. In connection with console 20, it should be noted that it also includes a slot 20*a* into which a punched card is inserted for recordation of the code along with the document. In operation, the document to be recorded is placed upon the recording table, and the coded index card, that is, the punched card, is inserted into slot 20*a*** on the console. Insertion of the card automatically triggers the recording camera, which then photographs both the document and the card simultaneously. When developed, the resulting film has the characteristics of the frame shown in FIG. 1.

A functional diagram of the FIG. 3 recording unit showing the principles of its construction and operation in greater detail is presented in FIG. 4. As shown therein, document 17 is positioned directly beneath mirror 25 which is tilted so as to form a 45 degree angle with both the recording table on which the document is placed and the face of the camera. In this way, the image of the document is reflected directly into the camera and onto a frame of film 26, a lens 27 being mounted in the camera and, therefore, between mirror 25 and film 26, to reduce the document's image to the desired recording size. Lighting to produce the reflected image of document 17 is provided by arms **23*a* and 23*b*, as mentioned previously, which directs the light toward the document at the most favorable angle. As may be seen from the figure, when recorded, the image of document 17 is recorded in an area designated 26*a* on film frame 26. Housed in console 20 and camera 24 is a lighting arrangement 30 above which is positioned a card reading plate 31. Card-receiving slot 20*a* is positioned between lighting 30 and plate 31, a punched card 17 being shown in the slot position in the figure. As will be shown and described in greater detail below, plate 31 has as many holes through it as there are positions or points on card 17 through which holes may be punched. Thus, plate 31 has eight columns of holes through it with fifty-six holes in each column, the holes in the several columns being arranged to form fifty-six rows of holes. Moreover, the holes through plate 31 are arranged to overlie the hole positions on the card, with the result that narrow tubes of light from lighting source 30 pass through those holes on plate 31 beneath which holes exist through card 17**.

Mounted immediately above plate 31 is a block of optical apparatus 32 which includes a bunch of optical fibers, a second plate with holes through it, a block of square-shaped optical rods, and a film negative on which is recorded a pattern from which will be derived the final code-block pattern to be recorded on film frame 26. More specifically, optical fibers are solid tubes of extremely small diameter made of a light-passing material, such as glass. These optical fibers have the characteristic of being able to transmit light from their input ends to their output ends with substantially no loss and, because they are so thin, they are flexible enough to be bent without breaking. Consequently, their output ends may be differently arranged than their input ends and for this reason they are most useful since, by means of these optical fibers, a pattern of light applied to their input ends may be transformed by them into a different pattern of light at their output ends.

In accordance with the present invention, the input ends of the abovesaid optical fibers are respectively mounted in the holes through plates 31, the output ends of these fibers respectively being mounted in the holes of the plate in optical block 32 whose holes are arranged in a pattern that resembles the final format of the code-block pattern to be recorded. With respect to the block of square-shaped optical rods, these rods are cemented together in such a manner as to form two groups of them that closely resemble sections **13(*a*) and 13(*b*) of code-block 12 in FIG. 1. Between these two groups of rods, is a thin plate of light-transmitting material, such as glass, from which bars 16a and 16b in FIG. 1 are produced. Another such light-transmitting plate is positioned adjacent to and on the extreme left of the entire block of these square-shaped rods and it is from this latter light-transmitting plate that frame marker 14 and timing marks 15 in FIG. 1 are ultimately produced. Finally, the film negative in optical block 32 is placed over the output face of the aforesaid block of square-shaped rods, the pattern recorded on the film being such that from it will emerge the code-block to be recorded alongside the document on film frame 26. Hence, the image emitted by the film negative is projected onto a mirror 33 from which it is reflected through a lens 34 to another mirror 35. As may be seen from the figure, mirrors 33 and 35 are tilted at appropriate angles, such as the 45 degrees shown in the figure, so as to finally project the image onto the designated code-block area on film frame 26**. By means of the arrangement shown in FIG. 4, both the document and the code-block are simultaneously recorded alongside one another on the film frame.

The block of optical apparatus 32 in FIG. 4, together with lighting 30, punched card 17, and card-reading plate 31, is shown in substantial detail in FIGS. 5A and 5B to which reference is now made. As previously stated, card 17 is positioned above lighting 30 and includes fifty-six rows of holes punched through the card, the number of holes in any one row and the particular arrangement of them being determined by the binary-coded data recorded in that row. As shown, the rows are arranged to form eight columns of holes, the eighth column having a hole in each row to make a total of fifty-six holes in that column. It will be obvious that light will pass through card 17 wherever a hole is punched through it. Positioned immediately over card 17 and in face-to-face relationship with it is card-reader plate 31 which, as has been previously mentioned and as is shown in FIG. 5A, has fifty-six rows of holes through it arranged in eight columns, eight holes to a row or, stated differently, fifty-six holes to a column. The holes through plate 31 coincide with the positions on card 17 whereat holes are or may be punched, with the result that light passing through holes on card 17 will also pass through the corresponding holes in plate 31.

A part of the apparatus in optical block 32 is another plate 36 through which holes are punched in a desired arrangement. More specifically, there are as many holes in plate 36 as there are in plate 31, the difference between them being in the format in which the holes are arranged. In particular, the holes through plate 36 are divided into two groups or sections generally designated 36a and 36b, each section including twenty-eight rows of these holes with eight equally-spaced holes in each row, as before, the holes being lined up to form eight columns of them. Thus, while the total number of holes through the two plates is the same the format of the holes through plate 31 is that of a single rectangle 8 x 56 whereas the format of the holes through plate 36 is that of two identical rectangles 8 x 28. In this respect, it should be noted that the format of the holes through plate 31 resembles the format of the holes punched through card 17 whereas the format of the holes through plate 36 resembles the format of the code-block to be recorded on the film. Intercoupling the holes through the aforesaid plates is a bunch of optical fibers generally designated 37, there being as many optical fibers in the bunch as there are holes in either one of the two plates. Thus, since there are 448 holes through each of the plates in the illustrative drawings, there are also 448 optical fibers, one optical fiber intercoupling only one hole through plate 31 with only one hole through plate 36. Considering the intercoupling in detail, the twenty-eight odd-numbered rows of holes through plate 31 are coupled by means of the optical fibers to the twenty-eight rows of holes comprising group 36a on plate 36 while the twenty-eight even-numbered rows of holes through plate 31 are coupled by means of the aforesaid optical fibers to the twenty-eight rows of holes in group 36b of plate 36. By way of example, the holes in row number 1 of plate 31 are respectively coupled and in the same order to the holes in row number 1 in group 36a of plate 36, the holes in row number 2 of plate 31 respectively being coupled and in the same order to the holes in row number 1 of group 36b on plate 36, the holes in row number 3 of plate 31 being coupled to the holes in row number 2 of group 36a of plate 36, the holes in row number 4 of plate 31 respectively being coupled to the holes in row number 2 of group 36b of plate 36, etc.

The construction of optical fibers 37 and the manner in which they are inserted or mounted in the holes of either plate 31 or plate 36 is shown in FIG. 6 wherein plate 31 is used for purposes of example. The optical fiber itself is designated 40 and, as shown therein, it is enclosed or jacketed by a sleeve 41 which not only protects the fiber but also helps to minimize light losses. Sleeve 41 may be nothing more than black plastic tubing. As for optical element 40, in practice it may be made up of as many as fifteen to seventy-five individual fibers, each fiber being ten microns in diameter. Thus, element 40 is, in fact, a small bundle of optical fibers protruding from the end of tubing 41, as is shown in FIG. 6, the protruding portion being inserted in a terminal element 42 designed both to hold or bind elements 40 and 41 together and to firmly hold the end portion of optical fibers 40 in a hole through plate 31. As may be seen, a hole through punched card 17 is directly beneath fibers 40, with the result that light from source 30 passing through the abovesaid hole in the card enters fiber 40 and is therein transmitted to its other end similarly mounted in a hole through plate 36.

Returning once again to FIG. 5, in particular to FIG. 5B, the apparatus in optical block 32 further includes a block of square-shaped optical rods, generally designated 43, the main block of rods being divided into two groups or sections designated 43a and 43b. The rods in either of sections 43a and 43b are individually coated with a thin film of material that will prevent loss of light from the rods and, therefore, will prevent cross-talk between them. For example, the rods may be aluminized. In addition, the rods in each of the sections are cemented together to form a solid unit or package. Each of sections 43a and 43b has twenty-eight rows of these square-shaped optical rods, seven of these rods in each row, the rows being arranged so as to also form seven columns of these rods. Hence, the cross-section of each of the abovesaid sections is a rectangle having 28 rods on one side and 7 rods on the other side. In this regard, it will be recognized that sections 43a and 43b very closely resemble groups or sections 36a and 36b, respectively. Cemented between sections 43a and 43b in an optical plate 43c, such as glass, that will pass or transmit light easily from one end to the other, another such plate 43d being cemented to section 43a at the left or free side thereof. It will be noticed, however, that plate 43d is slightly greater in height than plate 43c and, therefore, extends slightly above and below sections 43a and 43b and plate 43c. As will be seen later, plate 43c is used to produce bars 16a and 16b in code block 12 whereas plate 43d is used to produce frame marker 14 and timing marks 15.

The block of optical rods is so positioned that one of its faces, hereinafter referred to as the input face, is in face-to-face relationship with plate 36. More particularly, the input face of optical rods 43 is contiguous to plate 36, the input ends of the individual rods respectively being in alignment or in registration with the holes in plate 36. Consequently, the input ends of these optical rods are in registration with and contiguous to the output ends of optical fibers 37 which, it was previously mentioned, are mounted in the holes through plate 36. Accordingly, light transmitted through an optical fiber will be passed to the input end of the optical rod in registration with that fiber. Thereafter, the light will be transmitted by that rod to its output end. Thus, patterns of light appearing in columns 1–7 and rows 1–28 of sections **36*a* and 36*b* of plate 36 will produce corresponding patterns of light at the output face of optical rods 43, that is to say, similar patterns of light will be produced at the output ends of the optical rods in section 43*a* and 43*b*. As for the columns of light produced by column 8 in sections 36*a* and 36*b* of plate 36, column 8 in section 36*b* illuminates plate 43*c*. It is thus seen that the light passing through the holes in card 17 in one format ultimately emerges from optical rods 43** in another format.

Finally included in the apparatus of optical block 32 is a film negative 44 whose appearance is substantially the same as that for the output face of optical rods 43. Hence, film 44 has two rectangular areas on it in each of which are recorded 28 rows of square-shaped transparent areas, seven of these square-shaped areas per row. As before, the rows are arranged to form seven columns. The two rectangular areas on the film are designated **44*a* and 44*b* and, as can be judged from the description and determined from the drawings, they are identical in every respect with the rectangular areas of sections 43*a* and 43*b*. Between film areas 44*a* and 44*b* is another rectangular area designated 44*c* which is divided in half, one half being opaque and the other half being transparent. Area 44*c* is the same size as the face area of member 43*c* and it is this area 44*c* that is used to produce bars 16*a* and 16*b* in code block 12 recorded on film frame 26. A last rectangular area 44*d* is recorded on film 44 adjacent to and to the left of rectangular area 43*a*. As may be expected, area 44*d* is the same size as the face area of member 43*d* and is used to provide frame marker 14 and timing marks 15. For this purpose, area 44*d* is divided substantially in half, the left half being transparent and the right half being opaque except for twenty-eight evenly spaced narrow transparent slits that are respectively in alignment with the twenty-eight rows of square-shaped areas in rectangles 44*a* and 44*b***.

Film 44 is placed up against the output face of block 43 and as light emerges from it in a pattern, as previously described and for the reasons previously explained, the light passes through film 44 and is thereafter reflected to film frame 26 where it is recorded as code block 12.

Although a particular arrangement of the invention has been illustrated and described above by way of example, it will be recognized that the invention is not limited thereto. Thus, code block 12 may have fewer or more rows and/or columns of code and, furthermore, may have fewer or more binary bits per row. It it does, then there will be correspondingly fewer or more optical fibers, optical rods, etc. Again, the format itself of the code block may be re-arranged, in which case the arrangement of the holes through plate 36, of the optical fibers, optical rods, etc. will be correspondingly re-arranged. Accordingly, the invention should be considered to include any and all modifications, alterations or equivalent arrangements falling within the scope of the annexed claims.

Having thus described the invention, what is claimed is:

1. Apparatus for simultaneously recording on a frame of film the information on a document and the information on a card in the form of round holes punched through the card in a code, said apparatus comprising: first means for reflecting light off the surface of the document and to a first predetermined area on the film frame; a first plate member having as many round holes punched therethrough as there are hole-punching positions on the card, said first plate member being positioned face-to-face with the card and having the holes therethrough in registration with the hole-punching positions on the card; a second plate member having as many round holes punched therethrough as through said first plate member, the holes punched through said second plate member being arranged in two separate and distinct groups of several rows and columns each; a plurality of round optical fiber tubes equal in number to the number of holes through one of said plate members, said optical fiber tubes respectively intercoupling the holes through said first plate member with those through said second plate member; a block of optical rods of square cross-section equal in number to the number of holes through said second plate member and arranged in the same format therewith, said block being mounted so that the ends of the optical rods on one side of the block are respectively contiguous to and in registration with the holes through said second plate member; a light source for projecting light through the holes punched through the card, said light being propagated through the associated optical fiber tubes and optical rods; second means for projecting the light passed through said optical rods to a second predetermined area on the film frame; and an arrangement for simultaneously passing said light to said first and second film frame areas.

2. The apparatus defined in claim 1 wherein said second means includes a photographic film negative having a block of transparent squares recorded thereon, a pair of bars, one transparent and the other opaque, recorded to one side of said block of squares, and a plurality of timing markers recorded between said bars and said squares, said film negative being positioned contiguous to the output face of said optical block and in face-to-face relationship therewith, the squares, bars and timing markers recorded on said film negative being in proper registration with said square optic rods.

3. Apparatus for simultaneously recording a document and indexing information relating thereto on a single frame of film, said apparatus comprising: first means for projecting an image of the document toward a first predetermined area on the film frame; a card through which round holes are punched in accordance with a predetermined code to provide the indexing information, said holes being grouped in a single rectangular pattern of columns and rows; means for passing light through the round holes in said card; optical means for converting the round beams of light passed through said card in said single rectangular pattern to square beams of light arranged as a pair of rectangular patterns of columns and rows; second means for projecting the light in said pair of other rectangular patterns toward a second predetermined area on the film frame; and an arrangement for simultaneously passing the image of the document and the light in said pair of rectangular patterns to said first and second areas, respectively, on the film frame for recordation thereon.

4. The apparatus defined in claim 3 wherein said optical means includes a bundle of round optical fibers whose input ends are arranged in said single rectangular pattern and whose output ends are arranged in said pair of other rectangular patterns, the output ends of those optical fibers whose input ends lie in odd-numbered rows in said single rectangular pattern forming one of said pair of rectangular patterns and the output ends of those optical fibers whose input ends lie in even-numbered rows in said single rectangular pattern forming the other of said pair of rectangular patterns.

5. The apparatus defined in claim 4 wherein the input ends of said bundle of optical fibers are arranged to form a rectangular pattern having $m$ rows and $n$ columns of them, where $m$ and $n$ are integers greater than 1, and wherein the output ends of said bundle of optical fibers are arranged to form two rectangular patterns having $m/2$ rows and $n$ columns of them.

6. The apparatus defined in claim 5 wherein said optical means further includes an optical block having two groups of optical rods of square cross-section respectively arranged to form two rectangular patterns each having $m/2$ rows and $n-1$ columns of said optical rods, a first transparent plate positioned alongside and abutting against one of said groups of optical rods, said optical block being positioned in face-to-face relationship with the output ends of said bundle of optical fibers such that said optical rods and said first and second transparent plates are in registration therewith.

7. The apparatus defined in claim 6 wherein said optical means further includes a photographic film negative on which are recorded two groups of squares respectively arranged to form two rectangular patterns, each having $m/2$ rows and $n-1$ columns of said squares, a first pair of columnar bars, one transparent and the other opaque, between and abutting against said first and second groups of squares, a second pair of columnar bars, one transparent and the other opaque, alongside one of said groups of squares, and $m/2$ timing markers respectively interconnecting the $m/2$ rows of squares in said one group with the nearest one of the columnar bars in said second pair, said film negative being positioned in face-to-face relationship with said optical block such that the squares thereon are in registration with said optical rods.

8. In an apparatus for simultaneously recording a document and indexing data relating to said document said indexing data being in the form of round holes punched through a card in accordance with a predetermined code, an optical arrangement for converting the format of holes on said card to a different format, said optical arrangement comprising: a bundle of round optical fibers whose input ends are arranged in the format on the card and whose output ends are arranged in said different format; and a block of optical rods of square cross-section arranged in said different format, said block of optical rods being positioned in face-to-face relationship with the output ends of said bundle of round optical fibers and in registration therewith.

References Cited by the Examiner

UNITED STATES PATENTS

| | | | |
|---|---|---|---|
| 2,827,832 | 3/58 | Patterson et al. | 88—24 |
| 2,881,658 | 4/59 | Bornemann. | |
| 2,903,941 | 9/59 | Bornemann | 88—24 |
| 2,982,175 | 5/61 | Eisler | 88—24 |
| 3,029,717 | 4/62 | Hildebrandt | 95—1.1 |
| 3,109,065 | 10/63 | McNaney. | |
| 3,111,887 | 11/63 | Alexander | 88—1 X |
| 3,116,963 | 1/64 | Kiyasu et al. | 88—24 X |

NORTON ANSHER, *Primary Examiner.*